United States Patent Office.

JOHN L. DUFFEE, OF WASHINGTON, DISTRICT OF COLUMBIA.

Letters Patent No. 102,198, dated April 19, 1870.

IMPROVEMENT IN BRONZING AND GILDING.

The Schedule referred to in these Letters Patent and making part of the same.

*To all whom it may concern:*

Be it known that I, JOHN L. DUFFEE, of the city and county of Washington, in the District of Columbia, have invented a new and useful Composition for Gilding and ornamental purposes; and I do hereby declare the following to be a full, clear, and exact description of the method of compounding and using the same.

My invention relates to a composition for gilding and ornamenting articles, which can be applied to any surface and material with as much facility as paint, and at far less cost than the present mode of gilding; and It consists in the production of a liquid gilding of any shade and color, applied by means of a brush, without sizing or preparing the article; and, in the employment in said compound, in combination with gilding or bronze, representing gold, silver or other metals, of one or more gums used with and dissolved by alcohol, ether and ammonia, in proper proportions and applied to the powder when required for use, so as to produce a solution which will readily flow, adhere to the surface, and become perfectly hard.

The gums which I have found best adapted to produce the adhesive hardening and polishing effect of the metallic powder are gum-shellac, gum-mastic, gum-sandrac, and gum-demar.

These gums being insoluble in water are readily cut and dissolved by alcohol, and any or all of them may be used in the solution. I prefer, however, to use all of them in equal or unequal quantities, as they act in conjunction with the metal or other powder to produce a more compact and polished surface.

The ether and ammonia are used in equal or unequal proportions, as desired, but of less quantity than the alcohol, and are to produce a very rapid evaporation, while the ammonia is to increase the luster of the powder.

The rapid evaporation of the liquid causes the metal-powder and the gum to set quickly and become perfectly hard, and greatly aids in giving a fine surface as the brush is passed over it while the powder is in a semi-solidified condition, producing a gloss as if it had been polished.

The proportions of the several ingredients which form the mixing fluid may be of equal or unequal parts, and the proportions of the gum or gums, when all are used, may be of equal or unequal parts, so as to produce a liquid that will easily spread on any surface.

The liquid is mixed by itself and kept in bottles or vials, and when used is poured into a cup or pot upon the metal-powder in quantities to allow it to be used before being materially affected by evaporation.

The compound, therefore, is only mixed in quantities that will admit of immediate use.

The special feature of this liquid gilding consists in its general application, cheapness, durability, and its use by any person upon wood, glass, stone, metal surface, and anything that will receive paint of any kind.

The gilding or bronzing material must be reduced to a fine powder, and the mixing material is poured upon it into the vessel, and well-stirred by the brush before being used.

Gums shellac and demar possessing polishing as well as adhesive qualities, their use is, therefore, preferable.

Any surface coated with this gilding fluid may be cleansed with soap and water without affecting it in the least, or impairing its brilliancy, and it is especially valuable in the gilding or regilding of chandeliers, mirror frames, and, on account of its great cheapness, can be used to gild iron railings and any desirable household articles.

It is also especially adapted to lettering upon glass, thus dispensing with the costly gold-leaf now used for that purpose.

It may also be applied to machinery and ordnance of any description to prevent rusting.

It makes no difference whether the surface or article be greasy, rusty, rough, or smooth, the gilding or bronze will take equally well and bright, but a smooth surface is preferable. The only requirement in its application is that the surface or article must be dry.

The solution when made, being of a light straw-color, a silver gilding is produced by its mixture with silver, and a copper gilding by its mixture with copper powder, but a light, brown, and deep bronzing is produced by mixing copper, gold, and silver bronzes in suitable proportions. Other suitable gums than those mentioned may be used if deemed expedient.

I am aware that bronze has been applied to various articles, but the surface or article must be previously prepared with sizing, and burnished with a tool for the purpose after the bronze is applied and perfectly dry; but this method requires much labor and care to produce a smooth polished surface, which greatly enhances its cost, while the application of my improved gilding or bronzing compound requires no preparation of sizing, priming, cleaning, or subsequent burnishing or polishing, and requires only to be properly spread and smoothed with the brush so as to cover the surface of the article.

A single coat of this liquid gilding of proper body, I have found sufficient for nearly all purposes, but a second thinner coating may be used to increase the luster and render the surface more smooth.

When soft or composition metals are used the surface or article may, when bronzed, be covered by a coat of light varnish.

Having described my invention,

I claim—

1. In a gilding compound having for its base any bronzing or gilding powder, the use of alcohol, ether and ammonia, and one or more adhesive polishing-gums, for the purpose and applied as herein described.

2. The liquid solution, compounded as herein described, and used with any metallic bronzing or gilding powders.

3. In a liquid gilding compound prepared and used as described, producing different shades or tints by the admixture of different colors of metallic powders, as herein described.

4. The liquid bronze or gilding compound herein described, as a new article of manufacture.

In testimony whereof I have hereunto signed my name.

JOHN L. DUFFEE.

Witnesses:
T. H. UPPERMAN,
A. E. H. JOHNSON.